United States Patent [19]

Blüthgen et al.

[11] Patent Number: 5,315,525

[45] Date of Patent: May 24, 1994

[54] METHOD FOR SIMULATING THE MACHINING OF WORKPIECES

[75] Inventors: Reiner Blüthgen, Isernhagen; Klaus Deichmann, Hanover, both of Fed. Rep. of Germany

[73] Assignee: Grundig AG, Furth, Fed. Rep. of Germany

[21] Appl. No.: 146,828

[22] Filed: Oct. 29, 1993

Related U.S. Application Data

[63] Continuation of Ser. No. 761,266, Sep. 17, 1991, abandoned.

[30] Foreign Application Priority Data

Sep. 18, 1990 [EP]  European Pat. Off. ........ 90117969.7

[51] Int. Cl.$^5$ .............................................. G06F 15/46
[52] U.S. Cl. ........................ 364/474.26; 364/474.22; 364/474.24
[58] Field of Search .................. 364/474.22–474.27; 340/723–729

[56] References Cited

U.S. PATENT DOCUMENTS

| | | | |
|---|---|---|---|
| 4,714,920 | 12/1987 | Andernach et al. | 364/474.26 |
| 4,723,203 | 2/1988 | Kishi et al. | 364/474.26 |
| 4,734,845 | 3/1988 | Kawamura et al. | 364/474.26 |
| 4,788,481 | 11/1988 | Niwa | 364/474.26 |
| 4,823,253 | 4/1989 | Shima et al. | 364/474.26 |
| 4,831,542 | 5/1989 | Shima et al. | 364/474.26 |
| 4,994,977 | 2/1991 | Tsujido | 364/474.26 |
| 5,122,965 | 6/1992 | Nishida et al. | 364/474.26 |
| 5,122,966 | 6/1992 | Jansen et al. | 364/474.26 |
| 5,126,646 | 6/1992 | Fujita et al. | 364/474.26 |
| 5,150,305 | 9/1992 | Sekikawa | 364/474.24 |
| 5,175,688 | 12/1992 | Sasaki et al. | 364/474.22 |

FOREIGN PATENT DOCUMENTS

| | | |
|---|---|---|
| 0129091 | 12/1984 | European Pat. Off. . |
| 0136404 | 4/1985 | European Pat. Off. . |
| 0211959 | 3/1987 | European Pat. Off. . |
| 0308727 | 3/1989 | European Pat. Off. . |
| 0140937 | 12/1984 | United Kingdom . |

OTHER PUBLICATIONS

Patent Abstracts of Japan, vol. 10, No. 10 (P-450) (2167), Apr. 24, 1986.
Patent Abstracts of Japan; vol. 10, No. 102 (M-576) (2549), Mar. 31, 1987.
Koch: NC-Programmierung mit Hilfe eines Expertensystems . . . pp. 97–99 (1988).
Gehlsdorf: CNC-Technik der DDR holt auf (1989).

*Primary Examiner*—Jerry Smith
*Assistant Examiner*—Jim Trammell
*Attorney, Agent, or Firm*—Wood, Phillips, Van Santen, Hoffman & Ertel

[57] ABSTRACT

In a method for simulating the machining of workpieces on lathes utilizing a data processor, the unmachined contour of the workpiece to be machined, the finished contour of the workpiece and the contour of the tool are shown two-dimensionally on the screen. The path of movement of a defined tool reference point according to a machining program is shown. The part of the cutting edge of the tool intended to do the cutting is defined. The area traversed by this part of the cutting edge during each machining feed is outlined and made recognisable by a pattern in such a way that lines and patterns that already exist remain visible.

11 Claims, 4 Drawing Sheets

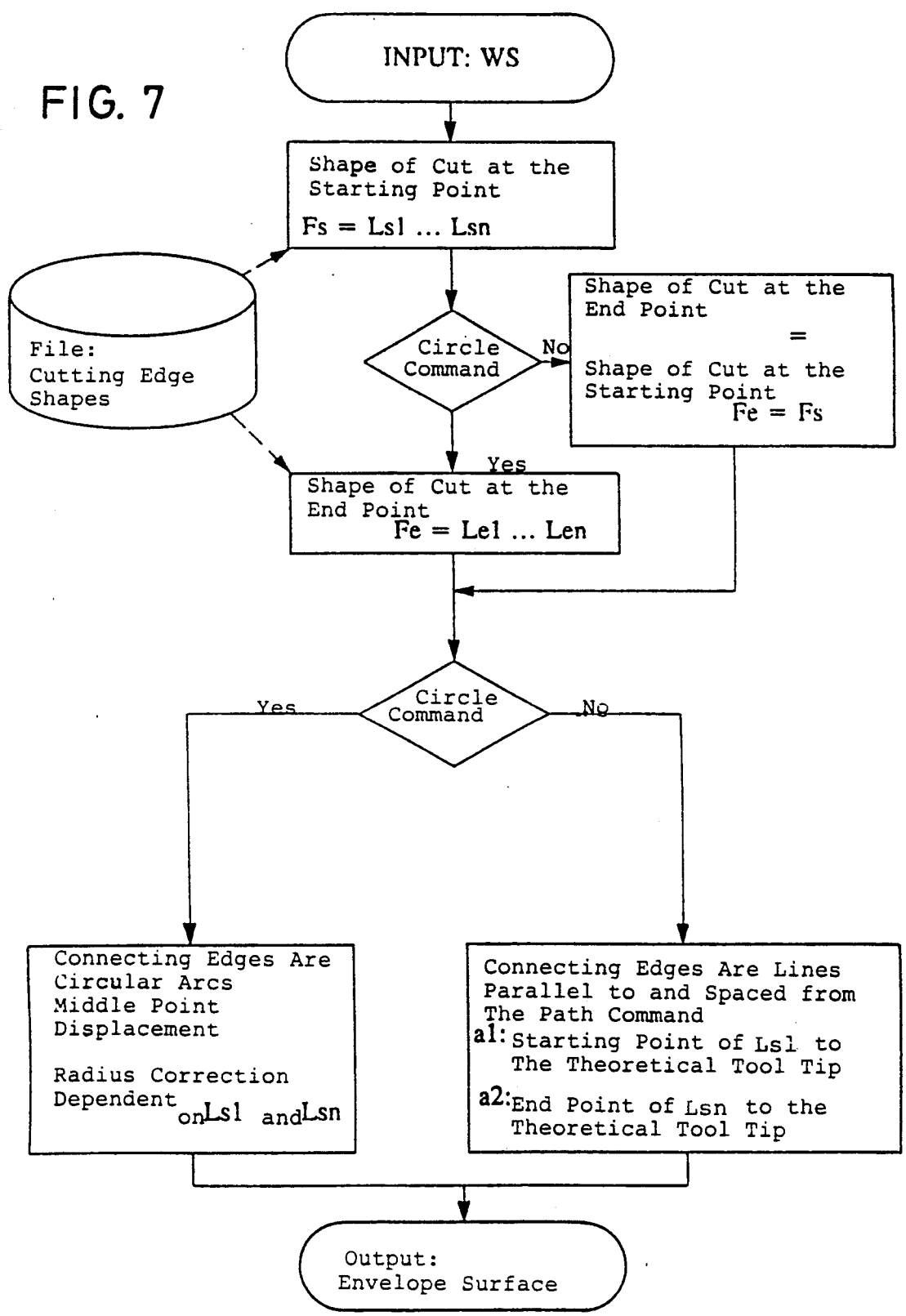

METHOD FOR SIMULATING THE MACHINING OF WORKPIECES

This application is a continuation of application Ser. No. 761,266, filed Sep. 17, 1991, now abandoned.

TECHNICAL FIELD OF THE INVENTION

The invention relates to a method for simulating the machining of workpieces on lathes.

BACKGROUND OF THE INVENTION AND PRIOR ART

There are essentially two types of machining simulation known for machine tools. In one type the path of a theoretical tool tip is represented as a line on the screen of an NC control means; this type is therefore also called line graphics. In the second, the area of a shaded image of a workpiece that overlaps a simplified representation of a tool contour is deleted from the screen— this type is also called deletion graphics. Both types are described in EP-B 0 129 091. They serve to monitor the risk of collisions and also show up serious programming errors.

The representation of the results of machining for an erosion machine is described in EP-A 308 727. The control means calculates the part of the workpiece cut away for each machining command and stores the shape of the cutout. Addition of all the cutouts gives the finished workpiece. The workpiece and the cutouts are shown.

A modification of the line graphics results if the theoretical cutting tip rotates and simultaneously carries out a feed movement As can be seen in Zeitschrift für Metallbearbeitung, 83, 1989, Vol. 11-12, pages 56-58 and in Werkstattstechnik 78 (1988), pages 97 to 99, this gives a two-dimensional impression which makes it possible to detect collisions and unfavourable tool shapes as well as unmachined regions. However, this simulation method is only suitable for milling operations, wherein the view of the workpiece must lie in the direction of the milling axis.

OBJECT OF THE INVENTION

It is an object of the invention to provide a method for simulating workpiece machining which, besides detecting collisions, also enables visual assessment of the technical relationships in the machining process.

SUMMARY OF THE INVENTION

This object is achieved by the main invention. Also, there is a simplified embodiment which requires less computer capacity and speed.

The degree of overlap or the utilization of the tool can be clearly seen if overlapping areas are highlighted by a denser pattern. This denser pattern results automatically if the pattern of successive feed movements is displaced or if its angular position is changed. In the case of rapid feed movements that have no technical effect, the representation of continuous lines suffices for detecting collisions. In addition the actual cutting position can be indicated by a spot of light at the point of the theoretical cutting tip.

The length of the defined cutting edge can be freely selected to adapt to the machining requirements. It can thus be advantageous, in the case of hard materials, to allow only a small cutting depth to avoid overstressing the tool.

The method can be used for all conventional tools, even multi-edged tools, used in lathes, irrespective of whether they rotate.

BRIEF DESCRIPTION OF THE DRAWINGS

The invention will now be described in more detail with reference to the accompanying drawings, in which:

FIG. 7 shows a flow diagram.

DETAILED DESCRIPTION OF PREFERRED EMBODIMENTS OF THE INVENTION

Figure 1:
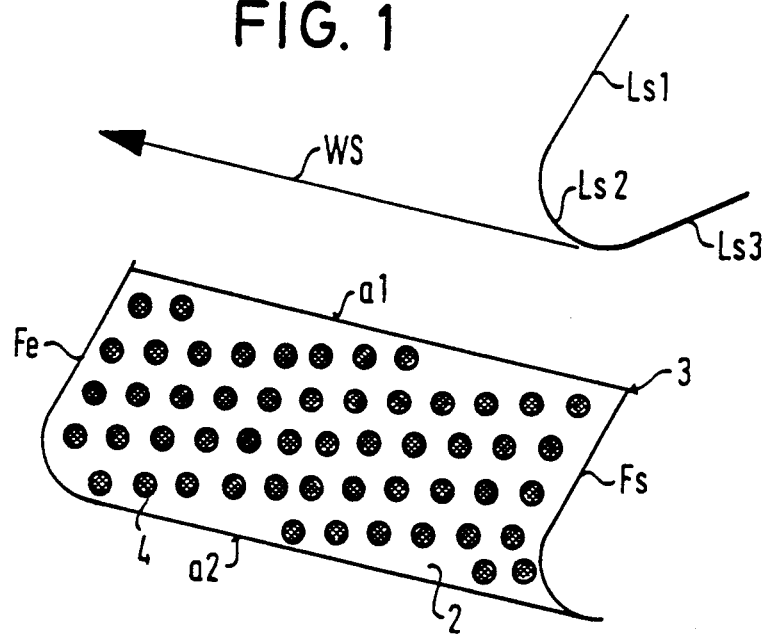
FIG. 1 shows the area traversed by the cutting edge of the tool.

FIG. 1 shows the part of the cutting edge 1 of a tool provided to cut a workpiece which comprises a straight line Ls1, a circular arc Ls2 and a further straight line Ls3. The tool and thus the cutting edge 1 is intended to carry out the positioning command WS in the machining feed. In doing so the area 2 is traversed by the cutting edge 1. The area 2 is bounded by the active part of the cutting edge at the starting point Fs and at the end point Fe, by the line a1 equidistant from the path command WS and passing through the starting point 3 of Ls1 and by the line a2 equidistant from the path command WS and passing through the furthest point of the cutting edge 1 transverse to the feed direction. The area 2 is filled with a dotted pattern 4.

Figure 2:
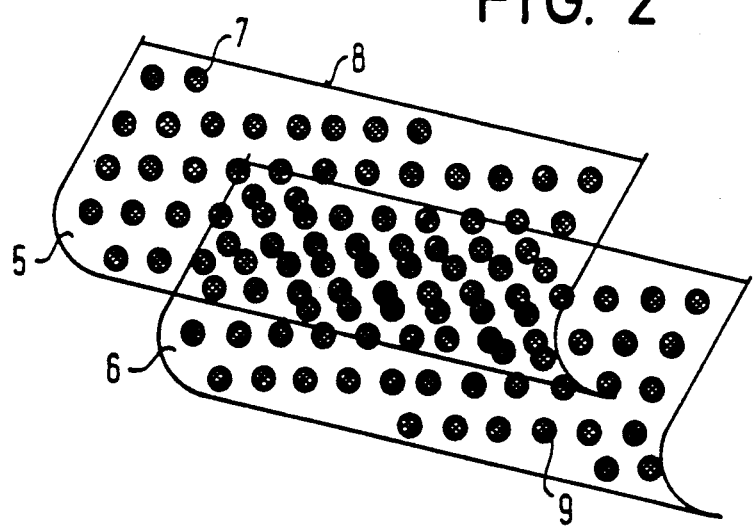
FIG. 2 shows two successive areas.

FIG. 2 shows the areas 5, 6 that are traversed by the cutting edge 1 in two successive machining feed movements, that partly overlap. The dotted pattern 7 and the boundary 8 of the area 5 remain visible even within the area 6. The dotted pattern 9 of the area 6 is arranged so that the previous pattern is not covered. In this way the degree of overlap is clearly visible.

Figure 3:
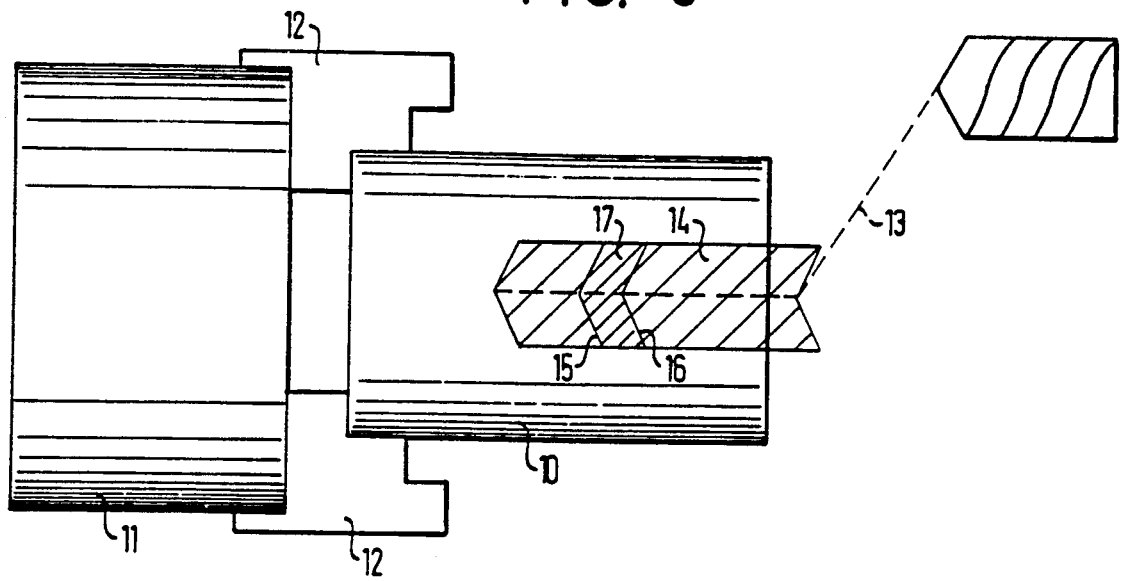
FIG. 3 shows the simulation of a drilling operation.

FIG. 3 shows the relationships in the case of a drilling process. Since cutting with only part of the cutting edge is not possible when boring into solid material, both main cutting edges must be defined in their entirety as cutting edges. The workpiece 10 to be machined is held by the jaws 12 of a chuck 11 of a lathe. The rapid traverse movement of the tool is shown as the broken line 13. The feed movement appears as the shaded area 14 which is bounded by the lines parallel to the direction of feed and passing through the outer cutting points. The first machining feed ends with the boundary 15 at the end point Fe. The drill is then withdrawn to remove turnings. The following machining feed begins at the starting point 16. The area 17 is thus traversed twice in the machining feed, as can be recognised from the double shading.

Figure 4:
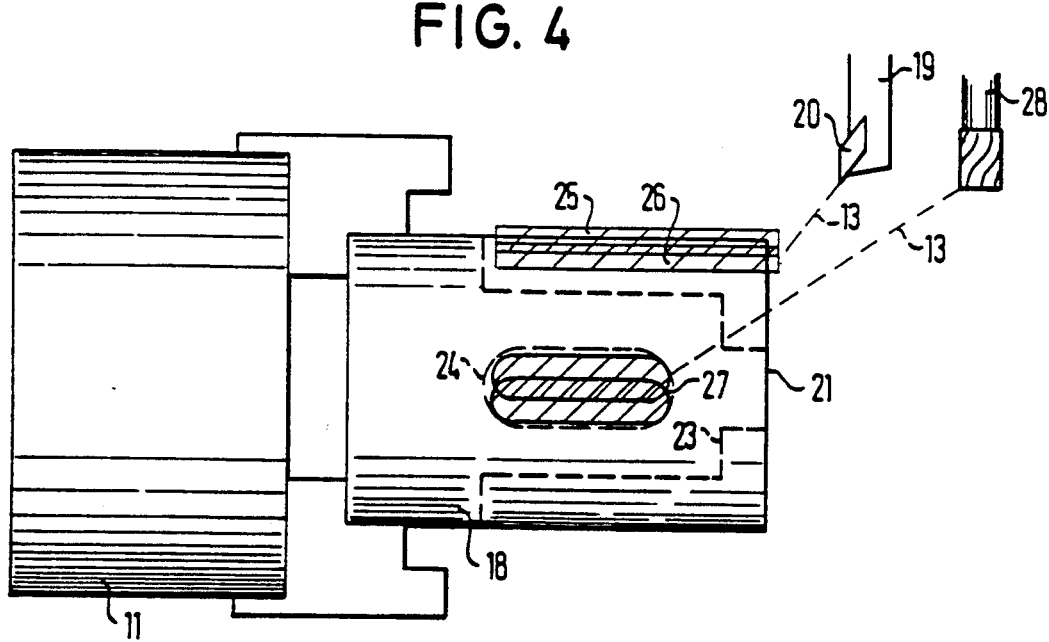
FIG. 4 shows the simulation of a turning and milling operation.

In FIG. 4 a workpiece 18 is clamped in a chuck 11 and is machined by a turning tool 19 having a cutting tip 20. The continuous line 21 represents the image of the unmachined part while the broken lines 23, 24 represent the finished part. Two successive cuts 25, 26 of the turning operation are shown, the positions of which in relation to the unmachined part and to one another are clear.

The milling of a feather keyway 27 is also shown on the workpiece 18. The cutting part of the cutting edges of a multi-edge tool 28 shown in this view is a circular arc. Here again the equidistant lines join the outermost points of the circular arcs.

Figure 5:
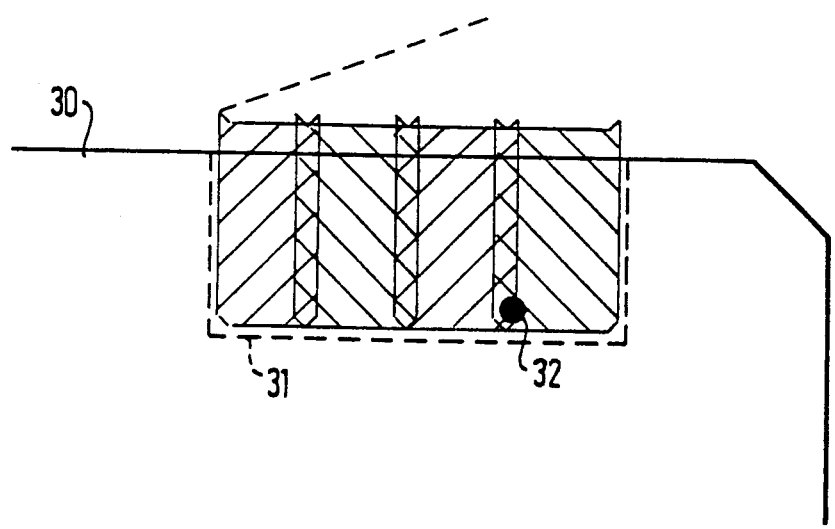
FIG. 5 shows the simulation of a plunge cut machining operation.

In FIG. 5 the simulation of a plunge-cutting process is shown. The workpiece is indicated by a continuous line 30. The contour 31 of the finished part is shown by a broken line. Successive machining feeds of the plunge-cutting tool are shown by the alternate inclinations of the shading, so that in the overlapping cutting area a diamond pattern results that is clearly distinguished from the individual cutting areas. The theoretical tool cutting point can in addition be detected as a spot of light 32 on the screen.

Figure 6:
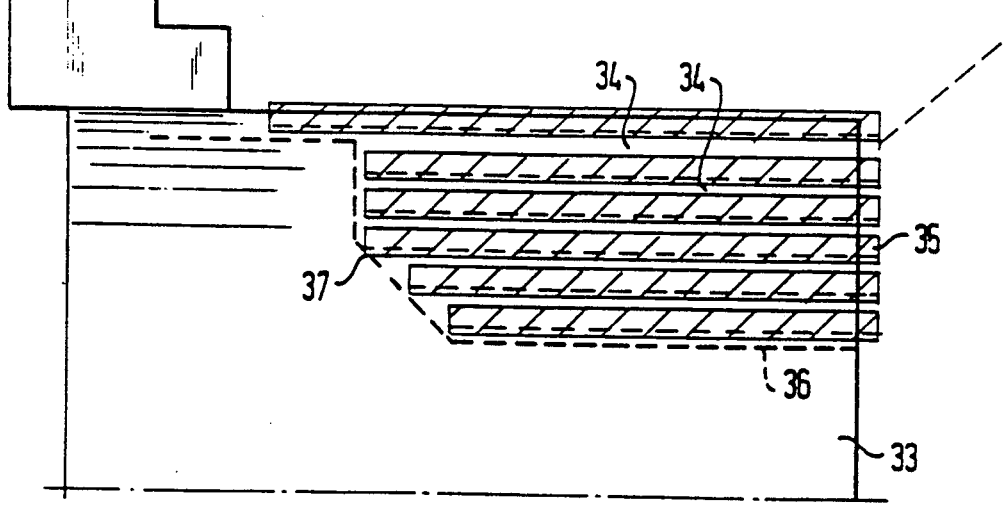
FIG. 6 shows the simulation of a faulty program.

FIG. 6 shows the external turning of a workpiece 33 using several cuts. It is immediately apparent that the cutting depth selected was too large for the edge intended to do the cutting. Webs 34 of material remain between successive cuts. It can also be seen that in the case of one of the cuts 35 the tool would damage the contour 36 of the finished part in the region 37.

FIG. 7 is a simplified flow diagram for generating the envelope surface. The starting point is the positioning command WS, wherein "S" is intended to indicate that only paths programmed with cutting speed are to be taken into consideration. The shape of the out is formed as a continuous line comprising straight line and circular elements and can stored in a data file.

It is also necessary to distinguish between straight lines and circles in the case of positioning commands because the shape of the cut only remains unaltered in the case of straight lines. The calculation of the equidistant lines also differentiates between straight line and circular shapes. The connecting edges in the case of circular commands are circular arcs which result from the mid-point displacement and the corrected radius.

What is claimed is:

1. A method for simulating the machining of a workpiece on a lathe, comprising the steps of showing in two dimensions a contour of an unmachined workpiece, a contour of a finished workpiece and a contour of a tool on a screen of a numerical control or programming device and also showing on said screen of said numerical control or programming device a path of movement of a defined tool reference point according to a machining program by defining a part of at least one cutting edge of the tool intended to do the cutting and outlining and filling a respective area that is traversed by the cutting edge part of the tool during a machining feed with a pattern that covers the area only in part so that already existing lines and patterns remain visible and the degree of overlap or utilization of the tool is highlighted by a denser pattern.

2. A method for simulating the machining of workpieces according to claim 1, including the step of producing an outlined area for each path command in the machining feed stored in the program.

3. A method for simulating the machining of workpieces according to claim 1, including the step of distinguishing the areas by shading.

4. A method for simulating the machining of workpieces according to claim 1, including the step of distinguishing the areas by dot matrices.

5. A method for simulating the machining of workpieces according to claim 1, including the step of displacing the reference point of the pattern between two successive feed movements by an amount that is smaller than the distance between two identical pattern elements.

6. A method for simulating the machining of workpieces according to claim 3, including the step of changing the angle of the shading between two successive feed movements.

7. A method for simulating the machining of workpieces according to claim 1, including the step of representing the path of the tool covered in rapid feed by the line which corresponds to the path of a defined point of the cutting edge.

8. A method for simulating the machining of workpieces according to claim 1, including the step of representing the current cutting position by a spot of light on the screen corresponding to the reference point of the cutting edge of the tool.

9. A method for simulating the machining of workpieces according to claim 1, wherein the defined cutting edge of a tool having a main edge only forms part of the actual edge length available.

10. A method for simulating the machining of workpieces according to claim 1, including the step in the case of a multi-edge tool of determining the outline of the area of projection as the defined cutting edge.

11. A method for simulating the machining of workpieces according to claim 1, including the step of forming the outline of the area traversed by the continuous line representing the cutting edge part of the tool and by lines equidistant from the path command.

* * * * *